March 21, 1961     O. L. WESTGATE     2,975,946
CONDIMENT DISPENSER
Filed Nov. 24, 1958
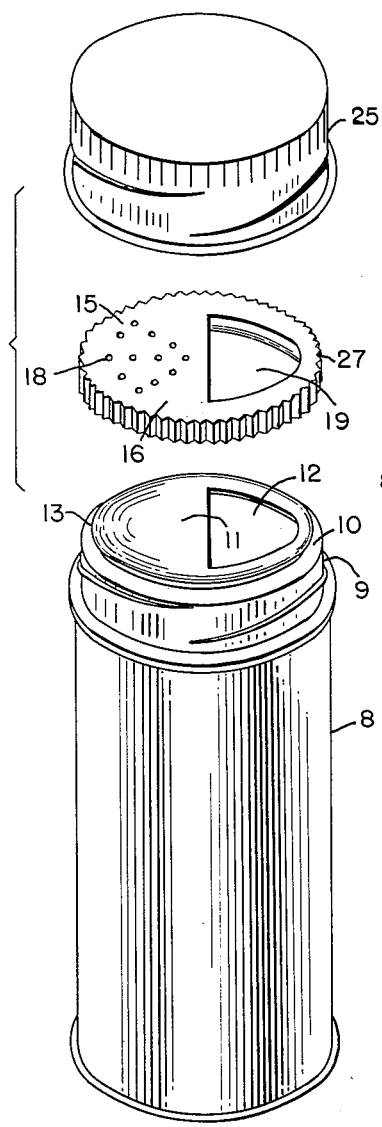
FIG. I.
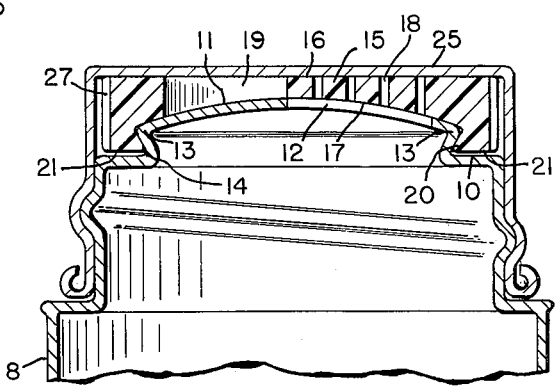
FIG. 2.
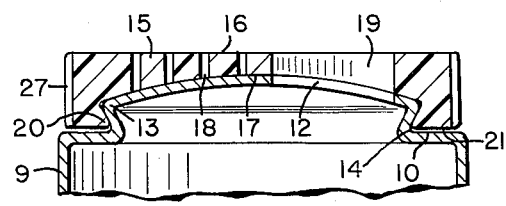
FIG. 3.
INVENTOR.
OSCAR L. WESTGATE
BY
Attorney

United States Patent Office 2,975,946
Patented Mar. 21, 1961

2,975,946
CONDIMENT DISPENSER

Oscar L. Westgate, Pittsford, N.Y., assignor to The R. T. French Company, Rochester, N.Y., a corporation of Delaware Filed Nov. 24, 1958, Ser. No. 775,820
3 Claims. (Cl. 222—480)

The present invention relates to condiment cans, and more particularly to condiment cans for household use in dispensing condiments, such as pepper, ground nutmeg, ground cinnamon, and the like.

The ordinary condiment dispenser has a top wall which has an opening through it; and there is a dispensing slide or disc mounted on top of the top wall which has one area provided with a plurality of perforations, and another area provided with an opening. By moving the slide or disc to bring its perforated area into registry with the opening in the top wall, the contents may be sifted from the container by shaking. By moving the opening of the slide disc into registry with the opening in the top wall, the contents may be poured from the can in bulk.

The conventional condiment cans of this type have many objectionable features. The slide or disc is difficult to operate and tends to bend and stick with the result that the housewife may break her fingernails when attempting to force the slide from one position to another. Moreover, when the opening in the slide is in registry with the opening in the top wall, it is difficult to pour the condiment into a receptacle, such as a pepper shaker or measuring spoon. Further, the hermetic seal, with which condiment cans are usually packed at the factory, has to be broken by the consumer in order to use the contents of the can, and the slide or disc, by which the can must thereafter be closed, cannot provide an air-tight seal. Therefore, the condiment in the can becomes exposed to air with the result that it ultimately loses some of its flavor or aroma, many times requiring the purchase of a fresh supply before the supply in the unsealed can is exhausted.

One object of the present invention is to provide a condiment can for ordinary household use which will avoid the objections to cans of conventional construction.

Another object of this invention is to provide a condiment can which will enable a condiment to be poured from the can without waste.

Another object of this invention is to provide a condiment can which will enable the user in removing a precisely measured quantity from the can.

Another object of this invention is to provide an improved condiment can which has an easily shiftable dispensing cover which can be positioned by the user, without any danger of breaking the fingernails or scratching the hands, to permit either pouring, sifting, or spooning the condiment from the can.

A further object of this invention is to provide an improved condiment can which can be hermetically sealed and resealed after each partial dispensing of the contents.

A still further object of this invention is to provide an improved condiment can having a dispensing cover which serves as a sealing gasket, and which can be readily removed from the can for cleaning.

A still further object of this invention is to provide an improved condiment can which may be made of very lightweight and thin metal, yet can be tightly and repeatedly sealed with uniform pressure and without denting or otherwise impairing the sealing surfaces of the can.

Other objects, purposes, and characteristic features of this invention will be apparent hereinafter from the specification and from the recital of the appended claims.

In the drawing:

Fig. 1 is an exploded perspective view of a dispenser made according to one embodiment of this invention;

Fig. 2 is a fragmentary cross-sectional view of the embodiment of the invention shown in Fig. 1 with its outer cover secured thereto; and Fig. 3 is a fragmentary cross-sectional view of the embodiment shown in Fig. 1 with its outer cover removed.

In the embodiment shown in the drawing, the dispenser comprises a cylindrical container 8 having an externally threaded neck portion 9. The neck portion 9 is formed at its top with an inwardly extending flange 10 which is connected by a peripheral undercut portion 14 with the top wall 11. The top wall 11 is of generally convex or shallow dome shape, and is formed with a peripheral lip 13 at its juncture with the undercut portion 14. The top wall 11 has a semi-circular opening 12 therethrough, which has a straight diametrical edge at one side. The opening 12 is of such a size, and is so positioned, that a portion of the convex surface of the wall 11 extends between the arcuate edge of the opening and the lip 13.

The body 8, the neck 9, and the wall 11 are preferably made from one piece of extruded aluminum, which may have a thickness of .008 of an inch. However, it is contemplated that the body of the container 8, may be formed of cardboard or plastic, and the neck portion 9 and the wall 11 may be formed of any other suitable type of metal, glass or plastic. The neck portion 9 may either be attached to the body portion 8, or may be integral with it.

A resilient, plastic disc shaped dispensing cover 15 is adapted to fit over the top of the container. This cover 15 is preferably made of a plastic, such as polyethylene or nylon, but may be made of any suitable flexible material. The dispensing cover 15 has at its bottom a plane annular flange 21 which is connected by an undercut with a spherical, concave undersurface 17; and it has a flat top surface 16. The concave surface 17 is adapted to engage the convex surface of the top wall 11. An internal rib 20 is formed at the juncture of the plane surface 21 and the undercut. The flexible cover 15 is inserted over the lip 13 by pressing it down upon the top wall 11, which causes the internal rib 20 to snap over the lip portion 13 into the undercut 14 thereby rotatably securing it in place. The plane surface 21 is substantially parallel to and spaced from the surface of the flange 10.

The cover 15 has a plurality of sifting openings 18 therethrough at one side of a diametral line, and also has a semi-circular opening 19 of the same size and configuration as the opening 12 at the other side of said diametral line. The peripheral edge of the dispensing cover 15 is knurled at 27 for rotating the cover to bring the sifting openings 18 and the semi-circular opening 19 selectively into registry with the opening 12 in the top wall 11.

A removable outer cover 25 is threaded onto the neck 9 over the cover 15 and is adapted to sealingly engage against the top surface 16 of the cover 15 when in threaded position.

In assembling the dispenser at the factory, the cover 15 is snapped over the lip 13. The outer cover 25 is then threaded on the neck 9. The dispenser is inverted and filled with a condiment. The bottom of the can is then reamed on the body portion 8 with a true double seam, to seal the can hermetically.

The threading of the outer cover 25 forces its undersurface to sealingly engage the top surface 16 of the dispensing cover 15, and compresses the cover 15 so that its concave surface 17 sealingly engages the surface of the convex top wall 11. The convex or shallow dome configuration of the thin metallic wall 11 permits a uniform pressure contact by the dispensing cover 15 over its entire surface. This convex configuration also provides added strength which minimizes the danger of denting or bending when sealing pressure is applied.

Because of the concave shape of the undersurface of the dispensing cover 15, the dispensing cover can be made thicker around its periphery, which gives inward strength, particularly along the outer edge of the opening 19, while the central portion having the sifting openings 18 can be made relatively thin. The increased thickness of the edge 27 of the dispensing cover 15 also provides a large surface to grasp for ease of rotation. The cover 15 can be forced downward until the lower plane surface 21 bears against the surface of the flange 10.

When the ultimate consumer desires to remove a portion of the contents of the dispenser, the outer cover 25 is threadably removed from the neck 9, and the dispensing cover 15 is rotated until either the opening 19 or the perforations 18 are in registry with the opening 12, depending upon whether the contents are to be sifted or poured from the can, or a measured quantity is to be removed therefrom. When the cover 15 is rotated so that its opening 19 is in registry with the opening 11, the straight edge of the opening 19 permits the wiping off and leveling of a teaspoon or other measuring spoon as it is withdrawn from the can. Because of the resiliency of the dispensing cover 15 and the ability to grasp the entire knurled surface formed on its other peripheral edge, it is apparent that the cover may be rotated as desired with extreme ease and facility.

After the desired amount of the contents has been sifted, poured, or spooned from the dispenser, in accordance with the position of dispensing cover 15, the outer cover 25 is replaced and threaded down on the neck 9 until it compresses the flexible cover 15 in sealing engagement with the top 11 and the neck 9, thereby hermetically resealing the dispenser.

Since all bearing and sliding surfaces between the dispensing cover 15, and the top wall 11 and the neck 9, respectively, are located on exterior surfaces of the dispenser, the dispenser may be easily cleaned without fear of contacting the contained spices with the cleaning cloth. Also, since the sifting perforations are located in the surface of the removable dispensing cover 15, this cover can be removed and any clinging condiment may easily be removed from the openings and other surfaces of the dispensing cover by merely holding this cover under a running faucet.

Thus, it is seen that I have provided an improved dispenser which has a resilient dispensing cover which is easily rotatable, which is so constructed that it will be less likely to become damaged from use, and also which is easily removed for cleaning. It is also apparent that I have provided an improved dispenser which can be constructed of a thin metallic sheet metal in the order of .008 of an inch and yet have substantially rigid characteristics, which also permits the resilient dispensing cover to serve as an effective sealing gasket between the tightly threaded outer cover and the neck portion.

Although this invention has been described in connection with a dispenser for condiments, such as herbs and spices, it is also understood that this dispenser may be useful in dispensing materials such as baby powders, boric acid, and other antiseptic powders.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A dispensing container having a neck which is circular in cross-section and which is closed at its top by a convex top wall, said top wall having an opening therethrough, said neck having a peripheral recess, a removable, resilient, plastic dispensing cover for said container which is also circular in cross-section and which has an internal annular rib adapted to snap into said peripheral recess to secure said cover to the container, said dispensing cover having a concave undersurface adapted to engage said convex top wall when said cover is secured on the container, said cover having a plane top surface and a plurality of sifting perforations therein, and a separate pouring opening therethrough, said cover being rotatable on said neck to bring said perforations or said opening selectively into registry with the first-named opening, said cover being thickest at its periphery and gradually tapering in thickness from its periphery to its center, the opening in said top wall and the pouring opening in said cover being semi-circular, the straight sides of said openings extending along diametral lines of said top wall and of said cover, respectively, and when in registry forming a wiping edge for leveling off a spoon as it is withdrawn from the container.

2. A dispensing container according to claim 1 having an outer cover adapted to fit over said dispensing cover, said outer cover being circular in cross-section and having means cooperating with the exterior surface of said neck for securing said outer cover to the neck, and said outer cover having a plane inside face engaging the plane top surface of said dispensing cover, when said outer cover is secured to said neck, for sealingly compressing the dispensing cover between the outer cover and the top wall and neck of said dispenser.

3. A dispensing container having a neck which is circular in cross-section and which is closed at its top by a convex top wall that has a dispensing opening therethrough, said neck having a peripheral recess, a removable, resilient, plastic dispensing cover for said container, said dispensing cover being circular in cross-section and having an annular internal rib adapted to snap over said neck into said peripheral recess to secure said cover to the container, said dispensing cover being of greatest thickness at its periphery and gradually tapering in thickness to its center and having a concave undersurface adapted to seat on said convex top wall and having a flat top surface, said dispensing cover having a dispensing opening therethrough and being rotatable on said neck to align the opening in said cover with the opening in said top wall, said dispensing cover being knurled around its periphery to permit it to be readily rotated, and an outer cover also circular in cross-section and having a flat inside face, said outer cover being adapted to be attached to said neck to fit over said dispensing cover for sealingly compressing the dispensing cover between said top wall and said outer cover.

References Cited in the file of this patent
UNITED STATES PATENTS

| | | |
|---|---|---|
| 2,029,219 | Bourland | Jan. 28, 1936 |
| 2,569,325 | Muscat et al. | Sept. 25, 1951 |
| 2,576,416 | Randlett | Nov. 27, 1951 |
| 2,622,258 | Giraud | Dec. 23, 1952 |

FOREIGN PATENTS

| | | |
|---|---|---|
| 354,298 | Great Britain | Aug. 4, 1931 |